United States Patent Office 3,426,102
Patented Feb. 4, 1969

---

3,426,102
POLYMERIZATES OF OLEFINIC NITRILES AND DIENE-NITRILE RUBBERS
Thomas A. Solak, Bedford, and June T. Duke, Orange Village, Ohio, assignors to The Standard Oil Company, Cleveland, Ohio, a corporation of Ohio
No Drawing. Continuation-in-part of application Ser. No. 480,766, Aug. 18, 1965. This application May 31, 1966, Ser. No. 553,705
U.S. Cl. 260—879                8 Claims
Int. Cl. C08f 3/76, 15/38

ABSTRACT OF THE DISCLOSURE

Impact resistant polymers having low permeability to gases and vapors are prepared by polymerizing an olefinic nitrile such as acrylonitrile optionally with an olefinic ester such as ethyl acrylate in an aqueous medium in the presence of a nitrile rubber.

---

This is a continuation-in-part application of our co-pending U.S. patent application Ser. No. 480,766, filed Aug. 18, 1965, and now abandoned.

The present invention relates to novel polymeric compositions which have low permeability to gases and more particularly pertains to impact resistant compositions which function as gas and vapor barrier materials and are composed of a conjugated diene monomer, an olefinically unsaturated nitrile and an ester of an olefinically unsaturated carboxylic acid and to a process for preparing same.

The novel polymeric products of the present invention are prepared by polymerizing a major portion of an olefinically unsaturated nitrile, such as acrylonitrile, and a minor portion of an ester of an olefinically unsaturated carboxylic acid, such as ethyl acrylate, in the presence of a preformed rubbery copolymer composed of a major proportion of a conjugated diene monomer, such as butadiene, and a minor proportion of olefinically unsaturated nitrile, such as acrylonitrile.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3 and the like and others. Most preferred for the purpose of this invention are butadiene and isoprene because of their ready availability and their excellent copolymerization properties.

The olefinically unsaturated nitriles useful in the present invention are the alpha, beta-olefinically unsaturated mononitriles having the structure

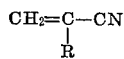

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids useful in the present invention are preferably the lower alkyl esters of alpha, beta-olefinically unsaturated carboxylic acids and more preferred are the esters having the structure

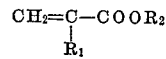

wherein $R_1$ is hydrogen, an alkyl group having from 1 to 4 carbon atoms, or a halogen and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl, alpha-chloro acrylate, ethyl, alpha-chloro acrylate and the like. Most preferred in the present invention are methyl acrylate, ethyl acrylate, and methyl methacrylate.

The polymeric compositions of the present invention can be prepared by any of the known general techniques of polymerization including the bulk polymerization, solution polymerization and emulsion or suspension polymerization techniques by batch, continuous or intermittent addition of the monomers and other components. The preferred method is emulsion polymerization. The important point in the novel process of this invention is that the novel polymeric products are prepared by polymerizing the olefinically unsaturated nitrile and the ester of the olefinically unsaturated carboxylic acid in the presence of a preformed copolymer of the conjugated diene monomer and the olefinically unsaturated nitrile. The polymerization is preferably carried out in aqueous medium in the presence of an emulsifier and a free-radical generating polymerization initiator at a temperature of from about 0° to 100° C. in the substantial absence of molecular oxygen. The simultaneous interpolymerization of a mixture of the conjugated diene monomer, the olefinically unsaturated nitrile and the ester of an olefinically unsaturated carboxylic acid does not produce polymeric products which resemble the polymeric products resulting from the instant process. Moreover, the physical blending of a copolymer of the conjugated diene monomer and the olefinically unsaturated nitrile with a copolymer of the olefinically unsaturated nitrile and an ester of an olefinically unsaturated carboxylic acid does not produce polymeric products which resemble in physical properties the polymeric products of the instant process.

The preferred polymeric compositions embodied herein are those resulting from the polymerization of 100 parts by weight of (A) at least 50% by weight of at least one nitrile having the structure

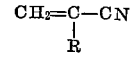

wherein R has the foregoing designation and (B) up to 50% by weight based on the combined weight of (A) and (B) of an ester having the structure

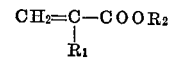

wherein $R_1$ and $R_2$ have the foregoing designation in the presence of from 1 to 40 parts by weight of (C) a copolymer of a conjugated diene monomer selected from the group consisting of butadiene and isoprene and an olefinically unsaturated nitrile having the structure

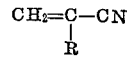

wherein R has the foregoing designation containing from 50 to 95% by weight of polymerized conjugated diene and from 50 to 5% by weight of polymerized olefinically unsaturated nitrile.

More specifically, the present invention can be illustrated in the polymerization of a mixture of acrylonitrile and ethyl acrylate in the presence of a preformed copolymer of butadiene-1,3 and acrylonitrile to produce a product having excellent impact strength and exceptionally good impermeability to gases and vapors when exposed to said gases and vapors in the form of a film or thin sheet. Preferably, the acrylonitrile-ethyl acrylate monomer feed should contain at least 50% by weight of acrylonitrile based on the combined weights of acrylonitrile and ethyl acrylate, and more preferably, the acrylonitrile fed to the polymerization reaction should be in the order of from 60 to 90% by weight based on the combined weight of all of the acrylonitrile and ethyl acrylate used in the polymerization.

The rubbery copolymer of butadiene-1,3 and acrylonitrile preferably contains more than 50% by weight of combined butadiene based on the total weight of combined butadiene and acrylonitrile. More preferably, the rubbery copolymer of butadiene and acrylonitrile should contain from 50 to 90% and preferably 60 to 80% by weight of polymerized butadiene.

In the foregoing polymerization it is preferred that from about 1 to 40, and preferably 1 to 20 parts of the rubbery copolymer of butadiene and acrylonitrile be employed for each 100 parts of combined acrylonitrile and ethyl acrylate. It has generally been found that as the relative amount of the rubbery copolymer of butadiene and acrylonitrile is increased in the final polymeric product, the impact strength increases and the gas and vapor barrier properties decrease somewhat. It is generally preferred to use just enough of the rubbery copolymer to impart the desired impact strength to the polymeric product and to retain the optimum gas and vapor barrier properties in the polymeric product.

The novel polymeric products of the present invention are thermoplastic materials which can be thermoformed into a wide variety of useful articles in any of the convention ways employed with known thermoplastic polymeric materials, such as by extrusion, milling, molding, drawing, blowing, etc. The polymeric products of this invention have excellent solvent resistance and their impact strength and low permeability to gases and vapors make them very useful in the packaging industry and they are particularly useful in the manufacture of bottles, film and other types of containers for liquids and solids.

In the following illustrative examples, the amounts of ingredients are expressed in parts by weight unless otherwise indicated.

Example I

A. A rubber latex was prepared by polymerizing with continuous agitation at 45° C. in the substantial absence of oxygen a mixture of the following ingredients:

| | Parts |
|---|---|
| Acrylonitrile | 40 |
| Butadiene-1,3 | 60 |
| GAFAC RE-610 [1] (emulsifier) | 2.4 |
| Azo-bis-isobutyronitrile | 0.3 |
| t-Dodecyl mercaptan | 0.5 |
| Water | 200 |

[1] Which is a mixture of $R-O-(CH_2CH_2O-)_nPO_3M_2$ and $[R-O-(CH_2CH_2O-)_n]_2PO_2M$ wherein $n$ is a number from 1 to 40, R is an alkyl or alkaryl group and preferably a nonyl phenyl group and M is hydrogen, ammonia or an alkali metal, which composition is sold by the General Aniline and Film Corp.

Before the reaction was started the pH of the mixture was adjusted to about 8 with KOH. The polymerization was carried out for 22½ hours to a conversion of 92% and a total solids of 33.1%.

B. A high impact, gas barrier resin embodied in this invention was prepared by polymerization of a mixture of the following ingredients:

| | Parts |
|---|---|
| Acrylonitrile | 70 |
| Ethyl acrylate | 30.0 |
| Latex A (above) | 31.9 |
| Potassium persulfate | 0.06 |
| GAFAC RE-610 (emulsifier) | 3.0 |
| n-Dodecyl mercaptan | 1.0 |
| Ethylene diamine tetracetic Acid (versene acid) | 0.05 |
| Water | 200 |

The pH was adjusted to about 7 with KOH. The polymerization was carried out on the substantial absence of oxygen at 60° C. for twenty hours so as to produce a conversion of 97% of a latex having 33% solids. The polymer was isolated from this latex by coagulation with dilute aqueous aluminum sulfate. The polymer was washed with water, dried and compression molded into a bar at 150° C. The molded bar was transparent, and was found to have a notched Izod impact value of 10.2 foot pounds per inch of notch, an ASTM heat distortion temperature of 65, a flexural strength of 10,500 p.s.i. and a flexural modulus of $3.8 \times 10^5$ p.s.i. The polymer was easily blended in a Brabender Plasticorder and at the end of six minutes in the plasticorder at 212–230° C. a reading of 1400 meter grams was obtained for the polymer. A sample of this polymer was compression molded to a sheet having a thickness of 0.0051 inch and this sheet was found to have a water vapor transmission of 9.5 by ASTM E-96. This sheet was found to have an oxygen transmission of 6.0 ASTM D-1434. When this sheet was biaxially oriented to a thickness of 0.0006 inch, it was found to have a water vapor transmission of 6.0 by ASTM E-96.

C. A terpolymer of 73.6 parts acrylonitrile, 30 parts ethyl acrylate and 5.4 parts of butadiene, which is outside the scope of the present invention, which was comparable in total monomer composition to the polymer B above was prepared by the polymerization procedure described in A above. A latex having 38.3 total solids resulted and the polymer was obtained in 87.7% conversion. The polymer was isolated, dried and compression molded into a test bar which was found to have a notched Izod of 0.20 foot pound per inch of notch.

D. A polymer which is outside the scope of the present invention having the same over-all monomer content as the polymer in B above was prepared in two stages by first preparing a 70:30 latex of acrylonitrile:ethyl acrylate by a procedure similar to the procedure of A above and then polymerizing the required amount of butadiene and acrylonitrile in the presence of the first latex by a procedure similar to the procedure of B above. The resulting polymer when compression molded was found to have a notched Izod impact of 0.21 foot pound per inch of notch.

E. The procedures of A and B of this example were repeated using a latex equivalent to that of A in Step B except that 48 parts of latex equivalent to that of A were employed in the recipe of B. The resulting polymer had a flexural strength of 8,900 p.s.i. and a notched Izod of 14.1 foot pounds per inch of notch.

F. A terpolymer which is outside the scope of the present invention was prepared using the same over-all proportions of acrylonitrile, ethyl acrylate and butadiene as in E by the procedure of C. The terpolymer was found to have a flexural strength of 5,300 p.s.i. and a notched Izod of 0.45 pound per inch of notch. The polymer was also yellow in color.

G. A copolymer of 70 parts acrylonitrile and 30 parts of ethyl acrylate which is outside the scope of the present invention was prepared by the procedure of C above. The resulting copolymer was found to have a notched Izod impact value of 0.2 foot pound per inch of notch and after six minutes in the Brabender Plasticorder at 212–230° C., a reading of about 1400 meter grams was observed for the polymer.

H. A physical blend of 70 parts of polyacrylonitrile, 30 parts polyethyl acrylate and 9 parts of a 40:60 acrylonitrile:butadiene rubber was prepared by blending latices of the foregoing polymers and coagulating the polyblend. The polymer blend which is outside the scope of the present invention could not be compression molded to a homogeneous bar for impact testing. This blend could not be fused into a homogeneous mass in the Brabender Plasticorder. The resulting mass was apparently a mixture of two or more completely incompatible polymers.

I. A blend of a latex of 40:60 acrylonitrile:butadiene equivalent to that prepared by the procedure of A above and a latex of 70:30 acrylonitrile:ethyl acrylate copolymer was prepared which resulted in a dry polymer blend of 100 parts of the acrylonitrile:ethyl acrylate copolymer and 9.1 parts of the acrylonitrile:butadiene polymer. The blend which is outside the scope of the present invention was found to have an ASTM heat distortion temperature of 66, a flexural strength of 14,500 p.s.i., a flexural modulus of $5.4 \times 10^5$ p.s.i. and a notched Izod impact of 0.39 foot pound per inch of notch.

Example II

A. A rubber latex was prepared at 45° C. in the substantial absence of oxygen for a period of 5½ hours employing a mixture of the following ingredients:

| | Parts |
|---|---|
| Acrylonitrile | 40 |
| Butadiene | 60 |
| Emulsifier | 2.4 |
| Potassium persulfate | 0.1 |
| t-Dodecyl mercaptan | 0.5 |
| Water | 200.0 |

The pH was adjusted to about 8 with ammonium hydroxide. At the end of the reaction a latex having 33% total solids in 97% conversion of monomers to polymer was obtained.

B. A high impact, gas barrier resin embodied in this invention was prepared by polymerizing at 60° C. in the substantial absence of oxygen for twenty hours the following mixture:

| | Parts |
|---|---|
| Acrylonitrile | 70 |
| Ethyl acrylate | 30 |
| Latex A (above) | 33 |
| Potassium persulfate | 0.06 |
| n-Dodecyl mercaptan | 1.0 |
| Emulsifier | 3.0 |
| Ethylene diamine tetraacetic acid | 0.05 |
| Water | 200.0 |

A conversion of 96% of monomer to polymer was achieved and the final latex had a total solids of 33%. The polymer was isolated from this latex by coagulation with dilute aqueous aluminum sulfate. The polymer was washed with water, dried and compression molded into a bar at 150° C. The molded bar was transparent, pale yellow in color and was found to have a notched Izod impact value of 9.7 foot pounds per inch of notch.

Example III

A polymer was prepared following the procedures of Example I-A and B with the exception that 25 parts of acrylonitrile and 75 parts of butadiene were used in a polymerization recipe similar to that of step A. The molded polymeric product was transparent and had an ASTM heat distortion temperature of 64, a flexural strength of 11,100 p.s.i., a flexural modulus of $3.5 \times 10^5$ p.s.i., and a notched Izod impact of 10.6 foot pounds per inch of notch.

A repeat of the foregoing procedure gave a final polymeric product having comparable physical properties and a notched Izod impact of 20.1 foot pounds per inch of notch.

When the foregoing proportions of monomers were employed in a blend of a latex made from 25:75 acrylonitrile:butadiene and a latex made from 70:30 acrylonitrile:ethyl acrylate, a blended polymer which is outside the scope of the present invention resulted having an ASTM heat distortion temperature of 65, a flexural strength of 14,430 p.s.i., a flexural modulus of $5.80 \times 10^5$ p.s.i. and a notched Izod impact of 0.46 foot pound per inch of notch.

Example IV

The procedures of Example I-A and B were repeated except that 15.2 parts of a latex equivalent to the prepared in I-A were used in the recipe of procedure B. The final polymer composition was found to have an ASTM heat distortion temperature of 65, a flexural strength of 13,600 p.s.i., a flexural modulus of $4.9 \times 10^5$ and a notched Izod of 2.0 foot pounds per inch of notch. When 5 parts of a 40:60 acrylonitrile:butadiene rubber were blended into 100 parts of a 70:30 acrylonitrile:ethyl acrylate polymer by melt mixing, the resulting mixture which is outside the scope of the present invention was found to have an ASTM heat distortion temperature of 66, a flexural strength of 6,120 p.s.i., a flexural modulus of $5.95 \times 10^5$ p.s.i., and a notched Izod impact of 0.40 foot pound per inch of notch.

Example V

A polymer was prepared by the procedures of Example I-A and B employing a latex equivalent to that of step A and 80 parts acrylonitrile, 20 parts ethyl acrylate and 50 parts of the latex equivalent to A were employed in a recipe equivalent to that of recipe B. The resulting polymer was found to have an ASTM heat distortion temperature of 67, a flexural strength of 5,180 p.s.i., a flexural modulus of $2.9 \times 10^5$ p.s.i., and a notched Izod impact of 1.90 foot pounds per inch of notch.

Example VI

The procedure of Example I-A and B was repeated using a latex equivalent to that described in I-A and employing 20 parts of the acrylonitrile:butadiene rubber per 100 parts of acrylonitrile-ethyl acrylate monomer mixture in the B step. A final polymeric product resulted which had excellent physical properties and a notched Izod impact of 29.2 foot pounds per inch of notch.

Example VII

The procedure of Example III was repeated using methyl acrylate in place of ethyl acrylate to produce a final polymer containing about 9 parts by weight of the butadiene-acrylonitrile rubber. The product had excellent physical properties including a notched Izod impact strength of 9.72 foot pounds per inch of notch.

Example VIII

The procedure of Example III was repeated with the substitution of a 14:86 acrylonitrile:butadiene rubber for the 25:75 acrylonitrile:butadiene rubber given in Example III and a monomer composition of 75 parts acrylonitrile and 25 parts methyl acrylate. The final polymeric product, containing 12 parts of the rubber per 112 parts of polymer, was found to have excellent physical properties including a notched Izod impact strength of 2.64 foot pounds per inch of notch.

Example IX

The procedure of Example VII was repeated with the exception that 0.6 part of hydrogen peroxide was used as the initiator in the grafting polymerization step. A final polymer resulted which had excellent physical properties including a notched Izod impact strength of 19.8 foot pounds per inch of notch.

Example X

The procedure of Example IX was repeated using a ratio of 75:25 acrylonitrile:methyl acrylate to form a final polymer having excellent physical properties and a notched Izod impact of 10.4 foot pounds per inch of notch.

Example XI

A. The procedure of Example III was repeated using methacrylonitrile in place of the 70:30 mixture of acrylonitrile:ethyl acrylate. Methacrylonitrile as the sole monomer was polymerized in the presence of a rubber latex such as that in Example III, using 0.4 part t-butyl peroxypivalate as initiator, 0.5 part of n-dodecyl mercaptan, 2.4 parts of emulsifier and 225 parts of water. The final polymer containing 10 parts of the 25:75 acrylonitrile:butadiene rubber per 110 parts of total polymer was found, when molded, to have a flexural strength of 13,560 p.s.i., a flexural modulus of $4.00 \times 10^5$, a heat distortion temperature of 96° C., excellent clarity, and a notched Izod impact of 4.44 foot pounds per inch of notch.

B. A methacrylonitrile homopolymer prepared as described above in the absence of any rubber latex was found to be clear and brittle when molded with a notched Izod impact of only 0.24 foot pound per inch of notch, a flexural strength of 18,500 p.s.i., a flexural modulus of $6.55 \times 10^5$ and a heat distortion temperature of 100° C.

C. The methacrylonitrile homopolymer latex as prepared in B above was blended with a latex of a rubbery copolymer of 25:75 acrylonitrile:butadiene to produce a blend containing 10 parts by weight of the rubber. The blend was coagulated and dried by the usual procedure. The resulting polymer blend was opaque when molded and it was found to have a notched Izod impact of 0.35 foot pound per inch of notch.

Example XII

Polymers designated A–D in this example are outside the scope of the present invention and are mentioned for comparison purposes only.

A. A copolymer of 90 parts by weight of methacrylonitrile and 10 parts of ethyl acrylate was prepared in an aqueous emulsion employing, in addition to these monomers, 0.3 part of t-butyl peroxypivalate initiator, 0.5 part n-dodecyl mercaptan, 2.4 parts emulsifier, and 200 parts of water at a polymerization temperature of 60° C. and at a pH of about 7. The copolymer thus produced was found to have a notched Izod impact of 0.17 foot pound per inch of notch.

B. By the procedure of A of this example, a copolymer of 95 methacrylonitrile, 5 methyl methacrylate was prepared which was found to have a notched Izod of 0.18 foot pound per inch of notch.

C. By the procedure of A of this example, a copolymer of 90 methacrylonitrile and 10 acrylonitrile was prepared using 0.4 part of initiator which was found to have a notched Izod of 0.28 foot pound per inch of notch.

D. By the procedures of A and C of this example, a copolymer of 90 methacrylonitrile, 5 ethyl acrylate and 5 acrylonitrile was prepared which was found to have a notched Izod impact of 0.30 foot pound per inch of notch.

E. The procedure of A of this example was repeated except that the monomer charge in the grafting step was 90:10 acrylonitrile:methyl acrylate and a latex of a rubbery copolymer of 25:75 acrylonitrile:butadiene was included in the polymerization recipe so that 15 parts by weight of the acrylonitrile:butadiene rubber were included in each 115 parts by weight of the final polymer. The final polymer was found to have a notched Izod impact of 4.13 foot pounds per inch of notch.

F. The procedure of B of this example was repeated except that a latex of a rubbery copolymer of 25:75 acrylonitrile:butadiene was included in the polymerization recipe so that 15 parts of the rubber were present per 115 parts of the final polymer. The product was found to have a notched Izod impact of 4.02 foot pounds per inch of notch.

G. The procedure of C of this example was repeated except that a latex of a rubbery copolymer of 25:75 acrylonitrile:butadiene was included in the polymerization recipe so that 10 parts of the rubber were included in each 110 parts of the final polymer. The product was found to have a notched Izod impact of 13.0 foot pounds per inch of notch.

H. The procedure of D of this example was repeated except that a latex of a rubbery copolymer of 25:75 acrylonitrile:butadiene was included in the polymerization recipe so that 10 parts of the rubber were included in each 110 parts of the final polymer. The product was found to have a notched Izod of 13.1 foot pounds per inch of notch.

I. The procedure of H of this example was repeated using a monomer mixture of 60 parts acrylonitrile, 30 parts methacrylonitrile and 10 parts ethyl acrylate. The final polymer product contained 9 parts of rubber per 109 parts of product. The final polymer was found to have a notched Izod of 10.3 foot pounds per inch of notch.

We claim:

1. The thermoplastic polymeric composition resulting from the polymerization in aqueous medium of 100 parts by weight of
   (A) at least 70% by weight of an alpha, beta-olefinically unsaturated mononitrile having the structure

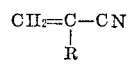

wherein R is a member selected from the group consisting of hydrogen, a lower alkyl group having from 1 to 4 carbon atoms and a halogen and
   (B) up to 30% by weight based on the combined weight of (A) and (B) of an ester of an olefinically unsaturated carboxylic acid having the structure

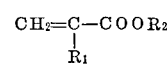

wherein $R_1$ is a member selected from the group consisting of hydrogen, an alkyl group having from 1 to 4 carbon atoms and a halogen and $R_2$ is an alkyl group having from 1 to 2 carbon atoms in the presence of from 1 to 20 parts by weight of
   (C) a copolymer of a conjugated diene monomer selected from the group consisting of butadiene and isoprene and an olefinically unsaturated nitrile having the structure

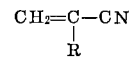

wherein R has the foregoing designation, said copolymer containing from 50 to 95% by weight of polymerized conjugated diene monomer and from 50 to 5% by weight of polymerized olefinically unsaturated nitrile.

2. The composition of claim 1 wherein the (A) component is methacrylonitrile.

3. The composition of claim 2 wherein there is employed 100% by weight of (A).

4. The composition of claim 1 wherein the (A) component is acrylonitrile.

5. The composition of claim 4 wherein the (B) component is ethyl acrylate.

6. The composition of claim 4 wherein the (B) component is methyl acrylate.

7. The composition of claim 6 wherein there is employed a mixture of 75% by weight of (A) and 25% by weight of (B).

8. The thermoplastic polymeric composition resulting from the polymerization in aqueous medium of 100 parts by weight of a mixture of
  (A) from 70 to 95% by weight of acrylonitrile and
  (B) from 30 to 5% by weight of methyl acrylate in the presence of from 1 to 20 parts by weight of
  (C) a copolymer of butadiene and acrylonitirle said copolymer containing from 60 to 80% by weight of polymerized butadiene and from 40 to 20% by weight of polymerized acrylonitrile.

References Cited

UNITED STATES PATENTS 3,133,135  5/1964  Ogle.
3,262,993  7/1966  Hagemeyer et al. ____ 260—879

FOREIGN PATENTS 923,469  4/1963  Great Britain.

GEORGE F. LESMES, *Primary Examiner.*

U.S. Cl. X.R.

260—29.7, 2.5, 82.3, 80.7, 887, 85.5, 80.81